United States Patent [19]

Kahn

[11] 4,170,029
[45] Oct. 2, 1979

[54] MULTIPLE SPEED DRIVE MECHANISM FOR CASSETTE RECORDERS

[75] Inventor: Donald D. Kahn, Camarillo, Calif.

[73] Assignee: Minnesota Mining and Manufacturing Company, Saint Paul, Minn.

[21] Appl. No.: 936,171

[22] Filed: Aug. 23, 1978

[51] Int. Cl.² .................... G11B 15/28; G11B 15/44; G11B 19/26
[52] U.S. Cl. .................. 360/96.1; 242/201; 360/73
[58] Field of Search .............. 360/96, 90, 93–95, 360/73; 242/197–201, 206–210; 74/194, 200–201

[56] References Cited

U.S. PATENT DOCUMENTS

| | | | |
|---|---|---|---|
| 3,542,312 | 11/1970 | Erickson | 242/202 |
| 3,823,945 | 7/1974 | Milligan | 360/96 |
| 3,825,209 | 7/1974 | Mikkelsen | 242/201 |
| 3,869,723 | 3/1975 | Yoshida | 360/96 |
| 3,934,270 | 1/1976 | Iwata | 360/96 |
| 4,011,586 | 3/1977 | Pastor et al. | 360/61 |
| 4,012,784 | 3/1977 | Murphy et al. | 360/5 |
| 4,031,554 | 6/1977 | Umeda et al. | 360/73 |
| 4,052,742 | 10/1977 | Pastor et al. | 360/96 |

Primary Examiner—Alfred H. Eddleman
Attorney, Agent, or Firm—Cruzan Alexander; Donald M. Sell; William B. Barte

[57] ABSTRACT

A drive mechanism for cassette type magnetic tape recorders is provided in which fixed, low-speed and high-speed modes are provided for record and/or playback operations. A motor pulley is continuously engaged with two idler wheels, each of which is mounted to be selectively moved into engagement with a different perimeter portion of a flywheel, the shaft of which forms a tape driving capstan. The different perimeter portions have differing diameters, such that when one or the other of the idler wheels is engaged, the flywheel and capstan are driven at a preselected low speed or high speed.

5 Claims, 4 Drawing Figures (SLOW SPEED)

(HIGH SPEED)

MULTIPLE SPEED DRIVE MECHANISM FOR CASSETTE RECORDERS

BACKGROUND OF THE INVENTION

(1) Field of the Invention

This invention relates to tape transport units adapted for use with magnetic tape recorders; particularly to those using magnetic tapes contained in cassette type enclosures and in which multiple tape speeds are provided for record and/or playback operations.

(2) Description of the Prior Art

The convenience of tape decks adapted to use magnetic recording tape preloaded in magazines such as the popular "Philips" type cassettes has resulted in such decks predominating the audio recorder market. Recently, as is reflected in U.S. Pat. Nos. 4,011,586 (Pastor et al), 4,012,784 (Murphy) et al), and 4,052,742 (Pastor et al), the use of cassette decks has been extended for use as voice actuated data or voice logging recorders such as are widely used in reel-to-reel form for monitoring communications involving police, fire and aircraft, and in providing accurate records of business meetings and legal proceedings.

Conventional cassette recorders often utilize prerecorded cassette loaded tapes, and thus embody mechanisms including a driven capstan for providing a single tape speed for record and playback operations, while enabling driving the supply and takeup hubs of the cassette in a second, high-speed mode for rewind or fast forward operations. Two or more predetermined tape speeds for record and playback operations are not generally desired.

SUMMARY OF THE INVENTION

In contrast to such single-speed, limited-capability cassette type decks, the present invention is directed to a multispeed cassette deck, having an extended capability, enabling both low and high tape speeds during record and playback operations, as well as in fast forward and rewind modes. The low-speed operation enables relatively low fidelity data to be recorded or played back while providing an extended duration of playing time for a given length of tape. The high-speed operation conversely shortens the playing time but enables relatively high fidelity data to be recorded or played back. The deck also enables the recording of tapes at a first set speed and the subsequent playback at a second set speed, thus providing accurate speed ratios for searching techniques.

Accordingly, the present invention is directed to a driving mechanism for a cassette type magnetic tape recorder suitable for voice logging, transcribing, or copying use. The mechanism includes a frame on which is rotatably mounted a flywheel-capstan assembly. An axially mounted shaft of the assembly rotatably mounted on the frame extends therethrough to form a capstan engageable with a pinch roller for advancing a magnetic tape positioned therebetween when the assembly is driven. The flywheel is mounted on the shaft and has a plurality of perimeter portions spaced along the axis. Each portion has an outer diameter adapted to engage with suitable drive means.

The drive means includes a drive shaft adapted to be driven at a relatively constant speed and a plurality of idler wheels for coupling the rotary motion at different axial portions of the drive shaft to corresponding perimeter portions of the flywheel. Each of the idler wheels is rotatably mounted on a carriage movable with respect to the frame, enabling the simultaneous engagement of all the idler wheels with the drive shaft while permitting selective independent engagement of only one idler wheel with a matching one of said perimeter portions of the flywheel, and disengagement of the remaining idler wheels from the other perimeter portions. The mechanism further includes means, such as a speed select linkage, for selectively moving a given carriage to so engage a given idler wheel while disengaging the remaining idler wheels. The perimeter portions of the flywheel and the axial portions of the drive shaft are selected to provide different ratios therebetween, thereby enabling the flywheel-capstan assembly to be uniformly driven at different angular velocities, resulting in different drive conditions for a single speed applied to the drive shaft.

The simultaneous engagement of all of the idler wheels with the drive shaft results in all the idler wheels being continuously driven and thereby minimizes the start-up time when the mechanism is switched from one speed to another. Such a capability is of considerable importance when the mechanism is utilized in voice logging operations. A slow start-up may result in the loss, i.e., non-recording, of an opening syllable of data which may include vital information. Continuous rotation of all idler wheels also results in less wear when the speed is changed, thus increasing idler life and reliability.

DESCRIPTION OF THE PREFERRED EMBODIMENT

Figure 1:
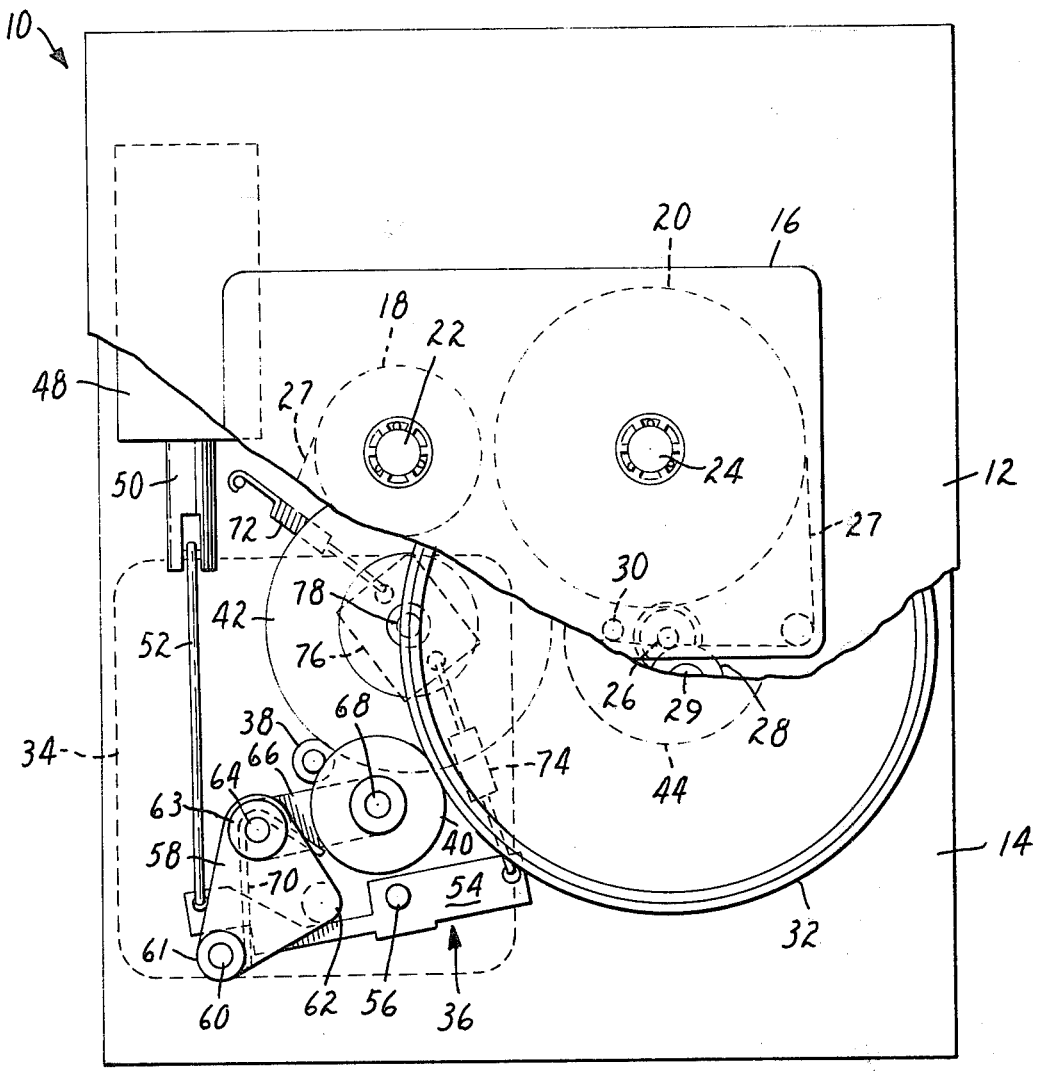
FIG. 1 is a plane view of a cassette type tape recording deck embodying the present invention, with parts broken away.

FIGS. 1–4 show a preferred embodiment of the present invention, including a driving mechanism similar in many respects to that set forth in U.S. Pat. No. 3,542,312 (Erickson), which disclosure is incorporated herein by reference. The mechanism comprises a frame and tape transport assembly 10, adapted to be enclosed within a housing (not shown). The assembly 10 includes an upper planar support member 12; a portion of which is shown cut away in FIG. 1 and a lower planar support member 14. The upper support member 12 is primarily adapted for supporting a preloaded magnetic recording cassette 16 and associated magnetic transducers thereon, while the lower member 14 is primarily adapted for supporting the tape drive mechanism. Such a cassette 16 includes a supply reel 18 and a takeup reel 20, the hubs of which are mounted on spindles 22 and 24, respectively, which spindles are conventionally driven by means (not shown) as set forth in the above cited patent. A tape 27 mounted on the reels 18 and 20 is positioned in a conventional manner between a driven capstan 26 and a pressure roller 28, which is supported on a support member 29 such that when the roller 28 is advanced to bear against the capstan 26, the tape is drawn past recording transducers (not shown) and a support member 30, after which it is taken up on the takeup reel 20. The capstan 26 forms a part of an axial shaft on which a flywheel 32 is supported, which not only has a large mass to ensure uniform rotational speed of the capstan 26, but which is also adapted to drive the spindles 22 and 24 as disclosed in the cited patent. The flywheel 32 is further adapted to be driven at two different speeds as set forth hereinafter.

The capstan 26 and the flywheel 32 are driven by a conventional synchronous motor 34 through a speed changing mechanism shown generally as 36, which includes a drive shaft having two different axial portions having differing diameters and two different axial portions of the flywheel 32, thus providing at least 2 different ratios therebetween. The motor 34 is thus provided with a two-step drive shaft such as the motor pulley 38 against which are continuously biased a low-speed idler wheel 40 and a high-speed idler wheel 42. As will be seen more clearly in the FIGS. 3 and 4, when low-speed operation is desired, the low-speed idler wheel 40 is moved to bring the perimeter of the idler wheel 40 into contact with the perimeter of the flywheel 32, thereby coupling the rotary motion from one step on the motor pulley 38 to the flywheel 32. Alternatively, when high-speed operation is desired, the high-speed idler wheel 42 is moved to bring the perimeter of that wheel into contact with a highspeed drive wheel 44, which is mounted on the capstan shaft and may be viewed as being a part of the flywheel assembly, thus coupling the rotary motion from the other step on the motor pulley 38.

Figure 2:
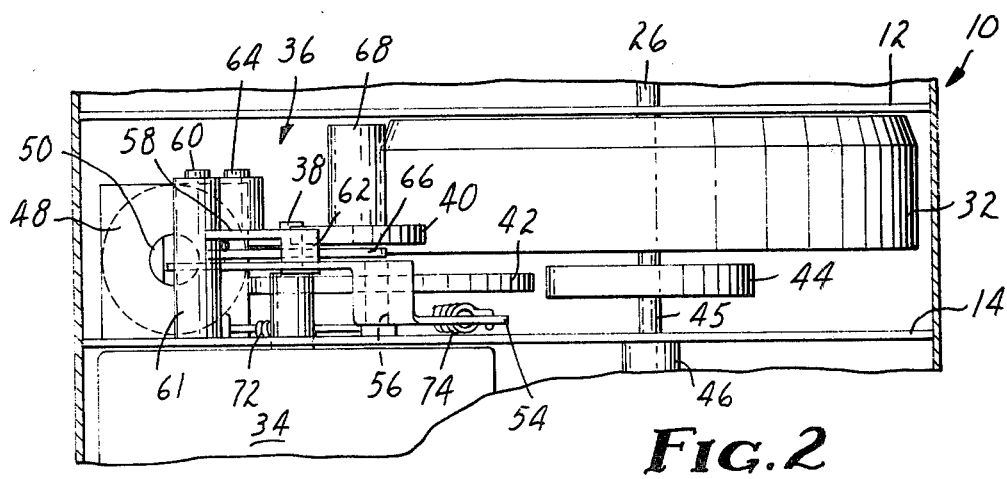
FIG. 2 is a side view of the embodiment shown in FIG. 1 with parts broken away.

As is shown more clearly in the sectional view in FIG. 2, the flywheel 32, the high-speed drive wheel 44, and the speed changing mechanism 36 are mounted between the upper and lower support members 12 and 14, respectively. The flywheel shaft 45 is pivotally mounted within a bearing 46 on the lower support member 14 and extends through the upper support member 12 to form the capstan 26.

The speed changing mechanism 36 shown in FIGS. 1 and 2 includes a solenoid 48 having an armature 50 which is coupled through a connecting link 52 to a speed change linkage such as lever 54. The lever 54 is pivotally mounted on a supporting pin 56 which in turn is mounted on the lower support member 14. The low-speed mechanism includes a generally triangular shaped low-speed control member 58, which is pivotally mounted on a pin 60 supported on the lower support member 14 and contained within a sleeve 61. The member 58 further includes a projection 62 adapted to bear against the speed change lever 54. The third leg of the control member 58 includes a journal 63 which rotatably supports a projecting pin 64. The pin 64 in turn is mounted on one end of a link 66, having on the opposite end thereof a projecting pin 68 which supports the low-speed idler wheel 40. The link 66 is biased toward the motor pulley 38 by means of a spring 70.

The high-speed mechanism includes a high-speed idler wheel 42 as discussed hereinabove, together with a high-speed defeat spring 72, a high-speed idler engage spring 74 and a high speed control member 76, having a projecting pin 78 on which the high-speed idler wheel 42 is pivotally mounted. The control member 76 is slideably mounted in a track formed by removal of portions of the lower support 14 (not shown).

Figure 3:
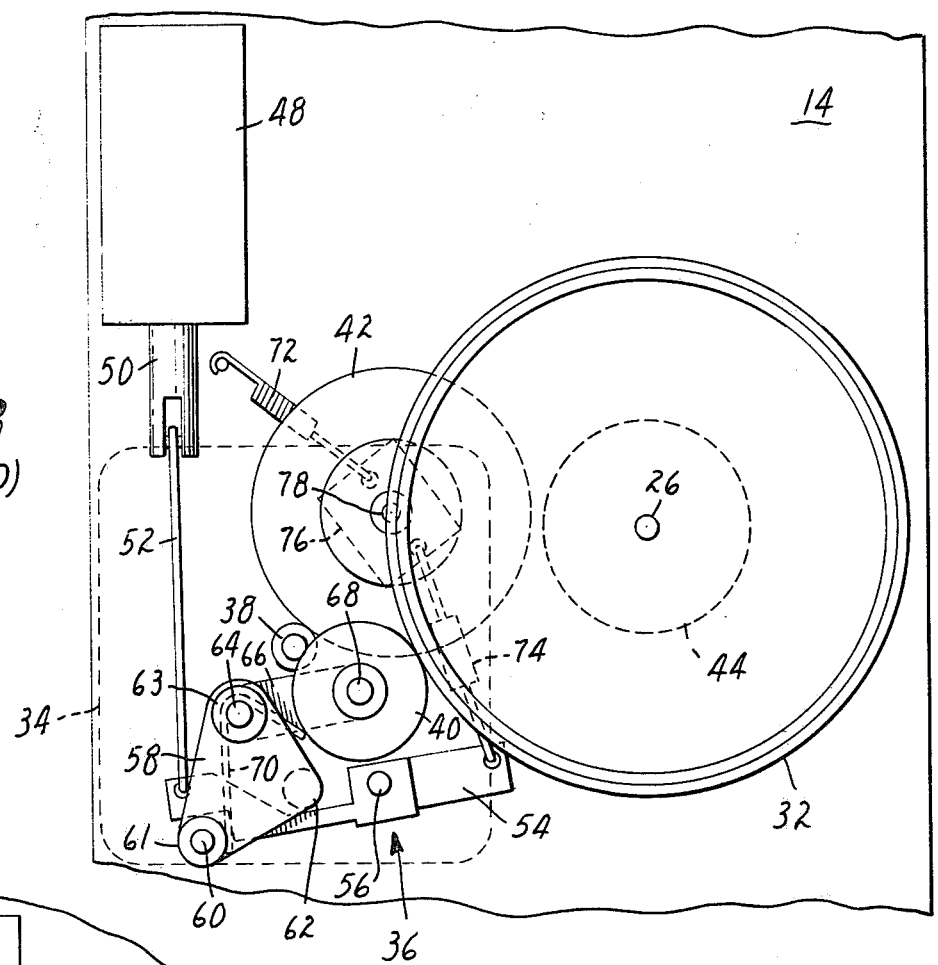
FIG. 3 is an exposed plane view of the embodiment shown in FIG. 1, with the upper portion of the deck removed, showing the drive mechanism positioned for low speed operation.

The operations of the low-speed mechanism and the high-speed mechanism are best described with reference to FIGS. 3 and 4, respectively. As shown in FIG. 3, in low-speed operations, the solenoid 48 is disengaged, such that the speed change lever 54 is rotated counter-clockwise about the pivot 56. This in turn allows the low-speed control member 58 to rotate clockwise, thus allowing the idler wheel 40, biased by the spring 70, to bear against both the motor shaft 38 and the outer periphery of the flywheel 32. Simultaneously, the high-speed defeat spring 72 linked between the lower support member 14 and the high-speed control mechanism 76 causes that mechanism to be moved to the left, thus pulling the high-speed idler wheel 42 away from the high-speed drive wheel 44, and ensuring that only the low-speed idler wheel 40 is in contact with the flywheel, such that the mechanism operates in the low-speed mode.

In contrast, when the solenoid 48 is engaged, thus placing the mechanism in the high-speed mode, the speed change lever 54 is rotated clockwise. This motion is coupled through the high-speed idler engage spring 74, causing the control member 76 to move to the right, thereby bringing the high-speed idler wheel 42 into contact with the periphery of the high-speed drive wheel 44. At the same time, as the speed change lever 54 is rotated clockwise around pivot 56, a portion thereof is caused to bear against the projection 62 on the low-speed support member 58, causing it to rotate counter-clockwise about the pin 60, thereby withdrawing the low-speed idler wheel 40 from the outer periphery of the flywheel 32.

Figure 4:
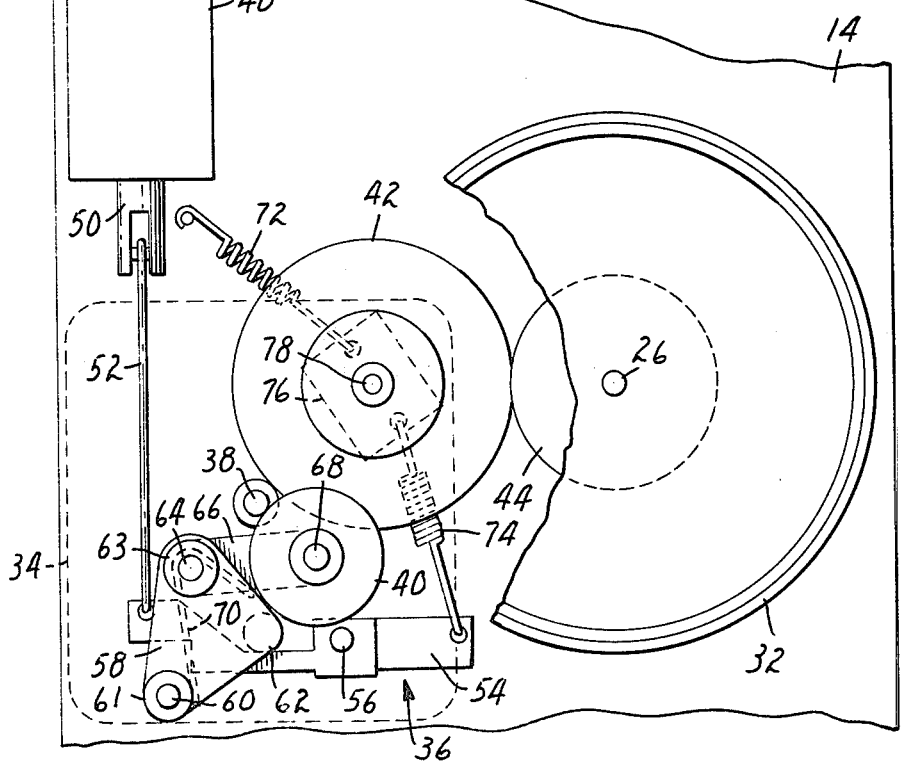
FIG. 4 is a partially cut-away plane view similar to that shown in FIG. 3, but in which the drive mechanism is shown to be positioned for high speed operation.

In the embodiment shown in FIGS. 3 and 4, the relative dimensions of the respective steps on the motor pulley, the low-speed and high-speed idler wheels and the diameter of the flywheel and high-speed drive wheel are selected to provide a low-speed tape drive of 15/32 inches per sec (ips) and a high-speed tape drive of $1\frac{7}{8}$ ips. Other desired speeds may similarly be provided by suitable modifications of the ratio of the diameters of the motor pulley and flywheel periphery.

Having thus defined the present invention by reference to a machine showing a preferred embodiment of the same, it will be appreciated that various changes and modifications can be made herein without departing from the scope of the invention.

I claim:
1. A driving mechanism of a cassette-type magnetic tape recorder suitable for voice logging use comprising
 (a) a frame,
 (b) a flywheel-capstan assembly including
  (i) an axially positioned shaft rotatably mounted on said frame and extending to form a capstan engageable with a pinch roller for advancing a magnetic tape positioned therebetween when the flywheel-capstan assembly is driven, and
  (ii) a flywheel mounted on said shaft having a plurality of perimeter portions spaced along the axis thereof for engaging suitable drive means,
 (c) drive means, including a drive shaft adapted to be driven at a relatively constant speed, having a plurality of different axial positions, and a plurality of idler wheels, each of which is rotatably mounted on a carriage movable with respect to said frame, enabling the simultaneous engagement of each of said idler wheels with a different one of the axial positions of said drive shaft and enabling the independent engagement of a given one of said idler wheels with a matching one of said perimeter portions of said flywheel, and (d) means for selectively moving a given carriage to engage one of said idler wheels with one of said perimeter portions of said flywheel and for disengaging the remaining idler wheels from the remaining perimeter portions, wherein said perimeter portions of said flywheel and said axial portions of said drive shaft are selected to provide different ratios therebetween, whereby the flywheel-capstan assembly may be caused to be uniformly driven at different angular velocities enabling alternative drive conditions.

2. A mechanism according to claim 1, wherein said means for selectively moving a given carriage comprises a speed change lever linked to each of said carriages such that rotation of said lever about a pivot causes selective engagement of a given idler wheel and selective disengagement of the remainder of the idler wheels.

3. A mechanism according to claim 2, wherein said engagement means further comprises (a) means for biasing a first idler wheel into engagement with a first perimeter portion of the flywheel when said speed change lever is in a first speed position and for overcoming said biasing means when said speed change lever is rotated to a second speed position, and (b) means for biasing a second idler wheel out of engagement with a second perimeter portion of the flywheel when the speed change lever is in said first position and for overcoming said bias to cause said second idler wheel to engage said second perimeter portion when the speed change lever is in said second position.

4. A mechanism according to claim 2, wherein said speed change lever is coupled to a solenoid which when actuated causes said lever to rotate from a first to a second position.

5. A mechanism according to claim 1, wherein each of said plurality of perimeter portions of said flywheel has a different diameter.

* * * * *